April 29, 1924.

A. J. LIEBENBERG

MOTOR CONTROLLER

Filed Jan. 25, 1922

1,492,079

Inventor:
Arthur J. Liebenberg
By Wood & Wood
Attorneys

Patented Apr. 29, 1924.

1,492,079

UNITED STATES PATENT OFFICE.

ARTHUR J. LIEBENBERG, OF CINCINNATI, OHIO, ASSIGNOR TO THE WARNER ELEVATOR MANUFACTURING COMPANY, OF CINCINNATI, OHIO, A CORPORATION OF OHIO.

MOTOR CONTROLLER.

Application filed January 25, 1922. Serial No. 531,716.

*To all whom it may concern:*

Be it known that I, ARTHUR J. LIEBENBERG, a citizen of the United States, and residing at Cincinnati, in the county of Hamilton and State of Ohio, have invented a new and useful Improvement in Motor Controllers, of which the following specification is a full disclosure.

This invention relates to a motor high speed controlling relay designed for use in the motor control circuit of electric power operated elevators, for the prevention of high speed motor operation under a load and rate greater than the high speed normal capacity.

An object of the invention is to prevent the operation of high speed motor control in either direction of motor rotation when the load is greater than normal high speed motor capacity. This object is accomplished by automatic electric control means, the operation of which is beyond the manual control of operator after the manual controlling switch has been operated.

The specific means for the accomplishment of the above-mentioned object consists, of a speed selecting relay, comprising a contactor lever operated by two magnets acting in opposition, one above the fulcrum of said lever and one below the same, the lower magnet having a single winding in series with the motor circuit, and the upper magnet having two windings, one in series with the motor armature circuit, the other in shunt substantially across the terminals of the armature, but not reversed with the armature. The armature of the double wound upper magnet has compressive spring connection with the said contactor lever, and when the said armature is attracted by its magnet the said lever is conditioned for a subsequent high speed circuit closing operation, when released at its lower end by the partial deenergization of the lower magnet, while the system is under normal load.

The relay hereinafter described, and its connection in the control system prevents excess current and consequent fuse blowing, and protects the motor against overload and resulting injury therefrom.

It is common practice to start an elevator motor with full field, because the motor then has greater torque, and the starting currents are reduced when the full field strength is used for starting. After the elevator has attained some fraction of high speed, the starting resistance has been short circuited and the motor is running on full voltage. It is possible to lift from fifty per cent to one hundred per cent more on low than on high speed, and with a load greater than normal, it is therefore desirable to automatically prevent high speed operation, which result is obtained by the means hereinafter more fully described.

Additional objects and certain advantages will be described in the specification and reference is made to the accompanying drawings, in which.

Figure 1:
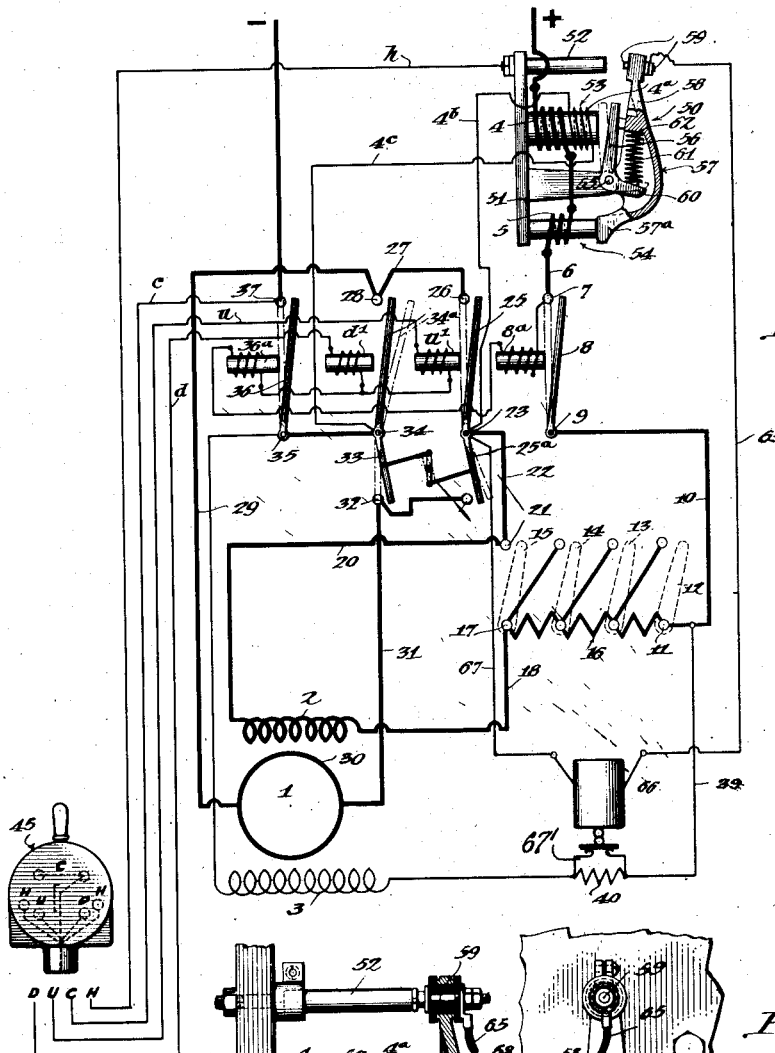
Fig. 1 is an electric elevator controller wiring diagram, showing my motor speed controlling relay connected therein.
Figures 2, 3:
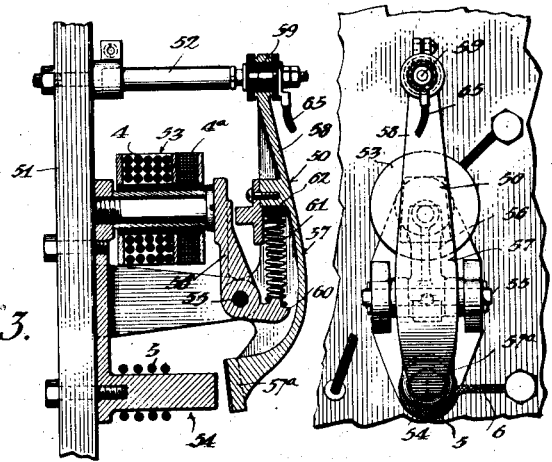
Fig. 2 is a front elevation of the speed controlling relay.
Fig. 3 is a central section of the same.

In the drawings, only such portions of the electric control system have been illustrated as are deemed sufficient for an understanding of the present invention. The dynamic resistance and brake magnet circuits have therefore been omitted.

The invention primarily is used in connection with electric current control for motors in elevator service, wherein conditions are encountered peculiar to such use, and for this reason the invention is disclosed in that capacity.

In elevator service it is highly desirable to provide an automatic electric current control for the motors beyond manual operation, for safety qualifications.

In motor controlling systems of such character, the motor starting and reversing switches are electrically operated through a pilot switch in the elevator cab. The starting resistance is automatically cut out in sections as the motor accelerates and precedes any high speed pilot switch manipulation, so that the motor control is through a definite cycle which cannot be varied by any manual control.

The system herein diagrammatically illustrated represents a starting and reversing switch of the commercial type, consisting of a plurality of magnet operated switches, four in number, each operated by its own magnet, and two of the switches mechanically connected to prevent simultaneous switch closing.

Motor circuit.

The motor herein shown and generally indicated at 1 is of compound wound direct current type, but this invention can be applied to any type of direct current motors for use in elevator service and also to alternating current motors. The series winding is designated 2 and the shunt winding 3.

The main circuits are shown in heavy lines. Starting at the positive side, the current passes to the speed selecting relay, generally designated at 50 and through the windings of a pair of magnets respectively designated 4, 5, located one above and one below the common fulcrum 50, of the armature lever 56, cooperating with magnet 4 and of contactor lever 57 cooperating with the magnet 5 and contact 52. The magnet windings are connected in series with and in the main line. From the lower magnet 5 the current passes through conductor 6, to upper switch contact 7, of the starting and reversing switch, through the switch arm 8, controlled, and now closed by magnet $8^a$ to terminal 9. From terminal 9, through conductor 10, to an end terminal 11, of the rheostat or starting resistance 16. The starting rheostat comprises the resistance 16, a plurality of switch levers 12, 13, 14 and 15, automatically operated in succession, as the motor accelerates for serially cutting out sections of the resistance, the resistance being entirely cut out when the motor has attained its normal speed. The mechanism for operating the switch levers is not disclosed herein, as it forms no part of this invention.

The starting resistance 16 is connected at 11 and when the rheostat switches are open, the current passes through said resistance, the opposite terminal 17 of which is connected by conductor 18, with the series field windings or coils of the motor 2. After passing through the series coils or windings, the circuit continues through conductor 20, to contact 21, of the rheostat switch 15, thence by conductor 22 to lower terminal 23, of the "up" motor direction controlling switch, and when the switch is closed across arm 25 thereof, to upper contact 26, conductor 27, contact 28 of the "down" switch (now open), and by conductor 29 to the left side of armature 30; thence through armature and by conductor 31, to the extreme lower contact 32 of the "down" switch, through lower leg 33 thereof, (which leg is closed when switch arm 25 is closed, because of the insulated mechanical interlock connection between the two switches), to terminal 34 of said "down" switch, thence to terminal 35 and across switch arm 36 (now closed by magnet $36^a$) to contact 37, and thence to the negative side of the main line.

The shunt-field coils or windings 3 obtain their current through the following circuit:

Starting at a point adjacent rheostat switch 12, corresponding to one side of the main line positive side, when switch arms 8 and 36 are closed, the circuit passes through conductor 39 to shunt-field resistance 40, through shunt-field coils 3, to contact 35, which corresponds to the main line negative side, when switch arm 36 is closed.

Main line switch and speed selecting relay circuits and operations.

The car switch, designated 45, is diagrammatically represented. This switch provides contacts C, U, D, H, said letters respectively designating direction symbols as "Common," "Up," "Down" and "High speed," connected respectively with conductors correspondingly designated $c$, $u$, $d$, $h$, and these conductors $c$, $u$, $d$, $h$, connect respectively with contact 37, magnet $u^1$, magnet $d^1$ and contact 52. The car switch contacts are disposed for engagement by an arm of the hand lever in a well-known manner, for selective circuit control.

Thus assume that the pilot switch 45 is thrown to close the circuit of the conductors $c$ and $u$ for an elevator up direction control, which control will complete the circuit through the magnet windings of the main motor starting switch, energizing the magnets of the respective switch levers 8, 25, 36, to move the same into their switch closing position. The circuit thus completed may be traced by starting from the positive side of the main line circuit at the switch terminal 7, thence through the magnet windings of magnet $8^a$ for the switch lever 8, the magnet $8^a$, when energized, attracting the switch lever 8, closing the main line motor circuit between terminals 7 and 9. The magnet windings of magnet $8^a$ are in series circuit connection with the windings of the magnet $36^a$ of the switch lever 36 closing the circuit at the negative side between terminals 37 and 35 when the magnet $36^a$ is energized. The magnet windings of magnet $36^a$ connect with the magnet windings of the magnet $U^1$ controlling the switch lever 25 for closing the circuit between the terminals 26 and 23 for an up or forward direction motor control. The switch lever 25 being mechanically connected to switch lever $34^a$ positively moving the switch lever $34^a$ to its open position and maintaining the same in such position as long as switch lever 25 remains closed. The magnet windings of magnet $U^1$ connect with the conductor $u$ leading from the motor starting switch to the pilot switch and from the pilot switch through conductor $c$ to the terminal 37 in connection with the negative side of the main line circuit. If the switch lever is thrown to an opposite side, magnet $U^1$ will be neutralized and magnet $d^1$ energized for closing switch lever $34^a$ for a motor reversal or down direction of travel of the elevator. As soon as the circuit to the motor is completed for either direction of motor rotation the switch levers 12, 13, 14 and 15 will be automatically operated successively as the motor accelerates, cutting out sections of the starting resistance 16, this operation following automatically with the closing of the motor circuit and, as an automatically operated starting rheostat is old and well known in this art, further detailed description is herein omitted.

The relay comprises a suitable base 51, supporting an upper contact member 52 and magnet 53, having two separate and distinct windings, one designated 4, which is in series with the motor armature main line circuit and the other designated $4^a$ connected in shunt substantially across the terminals of the motor armature, by conductors $4^b$, $4^c$, respectively attached to terminals 23, 34. Below the magnet 53 is a second magnet 54, the windings 5 of which are also in series with the motor armature main line circuit. Pivoted upon a common axis or fulcrum 55 between the magnets are respectively an armature 56, for the magnet 53, and a contactor lever 57, the lower arm $57^a$ of which contacts the core of the magnet 54 and the upper arm 58 carries an insulated contact 59, which, under certain conditions, engages the contact member 52, to close the high speed circuit, hereinafter described in detail, providing the car switch is in high speed position. The armature 56 is provided with an arm 60 extending, at right angles, against which abuts one end of a compression spring 61, the opposite end of which engages a shoulder 62 of the contactor lever 57, thus providing a yielding connection between said armature and said lever. When the armature 56 is attracted by magnet 53, the spring 61 is compressed, and if the lever 57 is attracted and held at its lower end by magnet 54 the high speed magnet circuit, will not be closed, by the contact 59. When, however, the pull of the lower magnet is sufficiently weakened the lever will be released and its upper contact 59 will engage member 52 to close the said high speed circuit. A conductor 65 connects contact 59 with one side of the high speed magnet coil 66, connection being made from the other side thereof by conductor 67 to terminal 23, the circuit passing therefrom successively through conductor elements, 22, 21, 20, 2, 18, 17, 16, 11, 10, 9, 8, 7, 6, 5, 4 to the plus side of the main line. Since higher motor speed is obtained by weakening the shunt-field, the closing of the circuit through the high speed magnet will energize this magnet breaking the circuit connection of the circuit branch $67^1$ which normally straps out the resistance 40, to connect resistance 40 in series with shunt-field, thereby obtaining high speed operation.

Figure 1 illustrates the condition of the electric control system, when the car switch is in neutral position. Under this condition, the relay contactor lever 57, actuated by gravity, engages at its lower end with the lower relay magnet 54. Whenever the control circuit is energized, both the upper and lower magnets 53, 54, are energized, conditioning the contactor arm for subsequent spring actuation to close the high speed circuit, if the load is not greater than the normal high speed capacity.

Now, assume that the pilot switch is thrown to a high speed position, say, for the motor forward rotation or elevator up travel, the circuit controlling the magnets of the starting switch, as heretofore described, remains completed and a second branch circuit is completed, provided the high speed conditions are normal, permitting the high speed circuit controlling relay 50 to complete the circuit between the pilot switch and the magnet windings of magnet 66 for controlling the shunt-field resistance 40. The high speed relay 50 being in circuit connection with the pilot switch through a conductor $h$ connecting with the contact member of post 52 of the relay, which relay, as to structure, function, and operation, forms the main feature of this invention.

Whenever the car switch or pilot switch is operated, both upper and lower magnets are energized, as before stated, both coils on the upper magnet act together, and both the armature lever 56 and the lower extremity of the contactor arm $57^a$ are magnetically attracted. The spring connection between armature lever 56 and the contactor arm 57 thus conditions the said arm for a high speed circuit closing operation whenever the lower relay magnet is sufficiently de-energized. If the elevator is ascending under normal high speed load, the lower magnet will not have sufficient strength to prevent the closing of said arm, and the high speed circuit will be closed, thus permitting high speed car travel. If the load is greater than the high speed normal load, the lower magnet winding excitation will be sufficiently strengthened by the excess current and the high speed circuit will remain open and prevent high speed operation, notwithstanding that the operator may throw his car switch to high speed position. When the car is descending with a heavy load, the motor qualifying as a generator, reverses the current in the series coils of the relay and if this reversed current is of a value to sufficiently neutralize the shunt coil 53, the armature 56 will not close and there would be no tendency for the arm 58 to close. If, however, the load is not greater than normal high speed capacity, then the current in the series coils will not have a value to sufficiently weaken the upper magnet, and the armature 56 will be attracted and close the contactor arm, released by the magnet 54, and will close the high speed circuit through contact 59.

The herein described relay is therefore adapted to protect motor from injury in both directions of elevator travel when under load greater than normal high speed capacity.

The motor high speed controlling relay generally may be referred to as comprising a compound wound magnet having one winding in series circuit connection with the main motor circuit and a second winding in shunt across the motor armature, with the windings of each in the same direction, and a second single wound magnet having its winding in series circuit connection with the main motor circuit and one of the windings of the compound wound magnet. Each of said magnets has its own armature lever, the levers yieldingly connected and arranged so that their respective magnets operate the levers in opposition to each other for controlling a circuit branch. This circuit branch controls a motor shunt-field rheostat. The windings of the relay magnets are relatively proportioned and of differential type and function to control the coordinate operation of their respective armature levers, for electric switch control, and this for the particular conditions encountered in elevator service, in which the motor, with the down travel of the elevator, under normal rates and load, is relieved of its torque as a driver and qualifies as a brake, while under excessive rates and load, loses its function as a driver and becomes a driven member, and thereby qualifies as a generator, energizing its own current counter and against the service current supplied to it as a motor.

This reaction results in neutralizing the windings of the compound wound magnet of the relay, and while the two windings are in the same direction, the direction of exciting current are relatively reversed. This necessarily makes the exciting force of the single magnet prevail to hold its armature lever closed or in a relay open position. Therefore, as long as the motor is capable of qualifying as a high speed and load-carrying driver, the energizing force of the compound wound magnet will prevail to hold its armature lever attracted for applying the maximum spring tension against the armature lever of the second or single wound magnet, so that it releases its armature lever for circuit closing to the rheostat magnet 66 cutting in the shunt-field resistance. The tension of the spring 61 primarily is counterpoise for actuating the relay.

While the high speed resistance controlling device is referred to as a relay, structurally it may be regarded as two relays having armature levers cooperating in opposition to one another for automatically controlling the insertion of the high speed resistance to the motor.

Having described my invention, I claim:

1. In an automatic high speed controller for electric motors, a motor, a motor high speed shunt-field resistance, electrically operated means for cutting in and out said resistance, a relay for automatically controlling the circuit to said electrically operated means, having a pair of magnets, each having an armature lever, the levers relatively cooperating in opposition to each other and yieldingly connected, one thereof controlling the circuit to said electrically operated means, the said magnets having windings in the armature circuit and one thereof, a second winding, in a shunt circuit across the motor armature.

2. In an automatic high speed controller for electric motors, a motor, a motor high speed resistance, a relay for automatically controlling said high speed resistance, having a pair of magnets, each having an armature lever, the levers relatively cooperating in opposition to each other and yieldingly connected, one thereof controlling said high speed resistance, the said magnets having windings in the armature circuit, and one thereof, a second winding, in a shunt circuit across the motor armature.

3. The combination of an electric motor having an armature and a shunt-field winding, a motor high speed resistance for said shunt-field winding, electro-responsive device for controlling said resistance, said device comprising a resistance circuit controlling member and actuating coils for said member respectively in series and shunt with the motor circuit and a second member and actuating coil therefor in series with the motor circuit controlling the actuation of said first member for automatically controlling said high speed resistance and thereby automatically preventing the cutting in of the high speed resistance under motor excessive rate and overload operations.

4. The combination of an electric motor, a motor field resistance controlling element, electro-magnetic means for moving said element for inserting the field resistance, an automatically controlled device for controlling a circuit to said electro-magnetic means, having a pair of magnets, the windings of said magnets being in series circuit connection with the motor armature circuit, a winding related to one of said magnet windings in shunt circuit connected across the motor armature, and armature levers for said magnets operating in opposition to each other for controlling a circuit to said electro-magnetic means.

5. The combination of an electric motor, a motor high speed resistance, electro-responsive device for controlling said resistance, said device comprising a resistance circuit controlling member and actuating coils for said member respectively in series and shunt with the motor circuit and a second member and actuating soil therefor in series with the motor circuit controlling the actuation of said first member for automatically controlling said high speed resistance and thereby automatically preventing the cutting in of the high speed resistance under motor excessive rate and overload operations.

6. The combination of an electric motor, a motor field resistance controlling element, electro-magnetic means for moving said element for inserting the field resistance, a manually operated motor controller switch for controlling a circuit to said electro-magnetic means, an automatically operative device for controlling a circuit to said electro-magnetic means, in conjunction with said manually operated controller, having a pair of magnets, the windings of said magnets in series circuit connection with the motor armature circuit, and a winding related to one of said magnet windings in shunt circuit connected across the motor armature, and armature levers for said magnets operating in opposition to each other for controlling a circuit to said electro-magnetic means.

In witness whereof, I hereunto subscribe my name, as attested by the two subscribing witnesses.

ARTHUR J. LIEBENBERG.

Witnesses:
 GORDON C. AREY,
 WARNER L. ATKINS.